United States Patent
Garelli et al.

(10) Patent No.: US 10,921,854 B2
(45) Date of Patent: Feb. 16, 2021

(54) ELECTRONIC DEVICE WITH SENSING STRIP

(71) Applicant: Apple Inc., Cupertino, CA (US)

(72) Inventors: Adam T. Garelli, Morgan Hill, CA (US); Dinesh C. Mathew, San Francisco, CA (US); Senem E. Emgin, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/390,505

(22) Filed: Apr. 22, 2019

(65) Prior Publication Data

US 2020/0081485 A1 Mar. 12, 2020

Related U.S. Application Data

(60) Provisional application No. 62/727,675, filed on Sep. 6, 2018.

(51) Int. Cl.
| | |
|---|---|
| *G06F 1/16* | (2006.01) |
| *G06F 3/01* | (2006.01) |
| *G06F 3/0354* | (2013.01) |
| *G06F 3/044* | (2006.01) |

(52) U.S. Cl.
CPC .......... *G06F 1/1616* (2013.01); *G06F 1/1662* (2013.01); *G06F 1/1681* (2013.01); *G06F 3/016* (2013.01); *G06F 3/03547* (2013.01); *G06F 3/044* (2013.01)

(58) Field of Classification Search
None
See application file for complete search history.

(56) References Cited

U.S. PATENT DOCUMENTS

| | | | |
|---|---|---|---|
| 9,377,860 | B1 | 6/2016 | Weber et al. |
| 9,519,365 | B2 * | 12/2016 | Hitosuga ................ G06F 3/041 |
| 10,061,396 | B1 * | 8/2018 | Shibayama ........... G06F 1/1677 |
| 10,175,721 | B2 * | 1/2019 | Sun ........................ G06F 1/1673 |
| 10,534,479 | B2 * | 1/2020 | Holmgren ........... G06F 3/04883 |
| 2008/0158172 | A1 | 7/2008 | Hotelling et al. |
| 2009/0228841 | A1 | 9/2009 | Hildreth |
| 2010/0026656 | A1 | 2/2010 | Hotelling et al. |
| 2011/0205186 | A1 * | 8/2011 | Newton ................. G06F 3/017 |
| | | | 345/175 |
| 2011/0289456 | A1 | 11/2011 | Reville et al. |
| 2014/0267130 | A1 | 9/2014 | Hwang et al. |

(Continued)

*Primary Examiner* — Duane N Taylor, Jr.
(74) *Attorney, Agent, or Firm* — Treyz Law Group, P.C.; G. Victor Treyz; Kendall W. Abbasi (57) ABSTRACT

An electronic device may have an elongated sensing strip. Control circuitry may use the sensing strip to gather air gesture input from the fingers or other body part of a user. The electronic device may have a housing. The housing may have portions such as upper and lower portions that rotate relative to each other about an axis. A hinge may be used to couple the upper and lower portions together. The sensing strip may extend parallel to the axis and may be located on the lower portion between keys on the lower portion and the axis or on the upper portion between the edge of a display in the upper portion and the axis. The sensing strip may have a one-dimensional array of sensor elements such as capacitive sensor elements, optical sensor elements, ultrasonic sensor elements, or radio-frequency sensor elements.

20 Claims, 5 Drawing Sheets

(56) References Cited

U.S. PATENT DOCUMENTS

| | | |
|---|---|---|
| 2014/0347296 A1* | 11/2014 | Yoshikawa ............ G06F 3/041 |
| | | 345/173 |
| 2015/0062069 A1 | 3/2015 | Shin et al. |
| 2015/0130742 A1 | 5/2015 | Chen et al. |
| 2015/0130764 A1 | 5/2015 | Woolley et al. |
| 2016/0067602 A1 | 3/2016 | Holmgren et al. |
| 2016/0162146 A1 | 6/2016 | Wu |
| 2017/0090865 A1 | 3/2017 | Armstrong-Muntner et al. |
| 2017/0285843 A1 | 10/2017 | Roberts-Hoffman et al. |
| 2018/0068636 A1 | 3/2018 | Kim et al. |
| 2018/0088632 A1 | 3/2018 | Dreessen et al. |
| 2020/0073512 A1* | 3/2020 | Jiang .................... G06F 3/0445 |

\* cited by examiner

ELECTRONIC DEVICE WITH SENSING STRIP

This application claims the benefit of provisional patent application No. 62/727,675, filed Sep. 6, 2018, which is hereby incorporated by reference herein in its entirety.

FIELD

This relates generally to electronic devices, and, more particularly, to electronic devices with sensors.

BACKGROUND

Electronic devices such as laptop computers and other electronic devices include input devices such as keyboards, touch pads, and touch sensitive displays. Using these input devices, users can control the operation of the electronic devices.

It can be challenging to operate electronic devices using certain input devices. For example, some input devices may operate best when a user is looking directly at the device. This may cause the user to look away from content that is currently being presented on a display and can disrupt a user's work flow.

SUMMARY

An electronic device may have an elongated sensing strip. Control circuitry in the electronic device may use the sensing strip to gather air gesture input from the fingers of a user. The control circuitry may gather the air gesture input by using the sensing strip to monitor motion of the user's fingers while the user's fingers are not touching the sensing strip. Use of the sensing strip to provide input in this way facilitates efficient operation of the electronic device by the user.

The control circuitry can control any suitable operations in the electronic device using the air gesture input. For example, the control circuitry can adjust operating modes, can launch applications, can select on-screen options and perform associated tasks, or can perform other operations based on air gesture input from a user's fingers.

The electronic device may have a housing. The housing may have portions such as upper and lower portions that rotate relative to each other about an axis. A hinge may be used to couple the upper and lower portions together. The sensing strip may extend parallel to the axis and may be located on the lower portion of the housing between keys on the lower portion of the housing and the axis or may be located on the upper portion of the housing between an edge of a display in the upper portion of the housing and the axis.

The sensing strip may have a one-dimensional array of sensor elements extending parallel to the axis along an edge portion of the housing. The sensing strip may be a capacitive sensing strip or may have optical sensor elements, acoustic sensor elements, radio-frequency sensor elements, and/or other sensing circuitry.

DETAILED DESCRIPTION

To enhance the ability of a user to operate a laptop computer or other electronic device, the electronic device may be provided with a sensing strip. The sensing strip may detect the presence of external objects such as a user's fingers. In some configurations, the sensing strip may detect touch events associated with direct contact of a user's fingers or other external objects with the sensing strip. The sensing strip may also detect the presence of a user's fingers or other external objects without direct contact between the objects and the sensing strip. For example, air gestures above the sensing strip may be used to control the electronic device.

Figure 1:
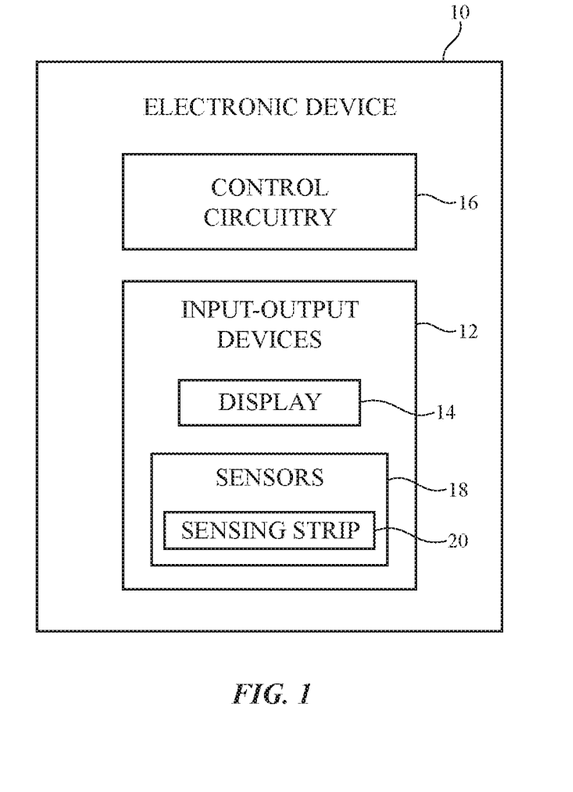
FIG. 1 is a schematic diagram of an illustrative electronic device with a sensing strip in accordance with an embodiment.

An illustrative electronic device of the type that may be provided with a sensing strip is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. Illustrative configurations in which a sensing strip such as an air gesture sensing strip is incorporated into an electronic device such as a laptop computer may sometimes be described herein as an example.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators and other haptic output devices, sensors with digital image sensors such as visible light cameras and other sensors, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be an organic light-emitting diode display, a liquid crystal display, or other display. Display 14 may be a touch screen display that includes a touch sensor for gathering touch input from a user or display 14 may be a touch insensitive display that is not sensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Input-output devices 12 may also include sensors 18. Sensors 18 may include magnetic sensors, ambient light sensors, force sensors, pressure sensors, microphones, humidity sensors, gas sensors, accelerometers, gyroscopes, and/or other sensors. Sensors 18 may be used in gathering information on the environment surrounding device 10 and may be used in gathering user input.

As shown in FIG. 1, sensors 18 may include sensing strip 20. Sensing strip 20 may have an elongated strip shape. For example, sensing strip 20 may include a set of sensor elements arranged along a longitudinal axis to form a strip-shaped sensor. The sensing strip may measure the behavior of nearby external objects. For example, the sensing strip may detect contact between the external objects and the sensing strip and/or may detect external objects that are in the vicinity of the sensing strip without directly touching the sensing strip (e.g., when fingers or other objects hover over the sensing strip in particular locations or move along the sensing strip). The external objects may be the fingers of a user and/or other external objects (e.g., a computer stylus, user body parts other than the user's fingers, etc.). Illustrative configurations in which the external objects being sensed are the fingers of a user are described herein as an example.

The sensing strip may be an elongated (strip-shaped) capacitive sensor (e.g., a capacitive sensor having a one-dimensional array of capacitive sensor electrodes for detecting finger touch events and/or finger air gestures) or may be based on other sensing technologies (e.g., optical sensing, ultrasonic sensing, radio-frequency sensing, etc.).

Figure 2:
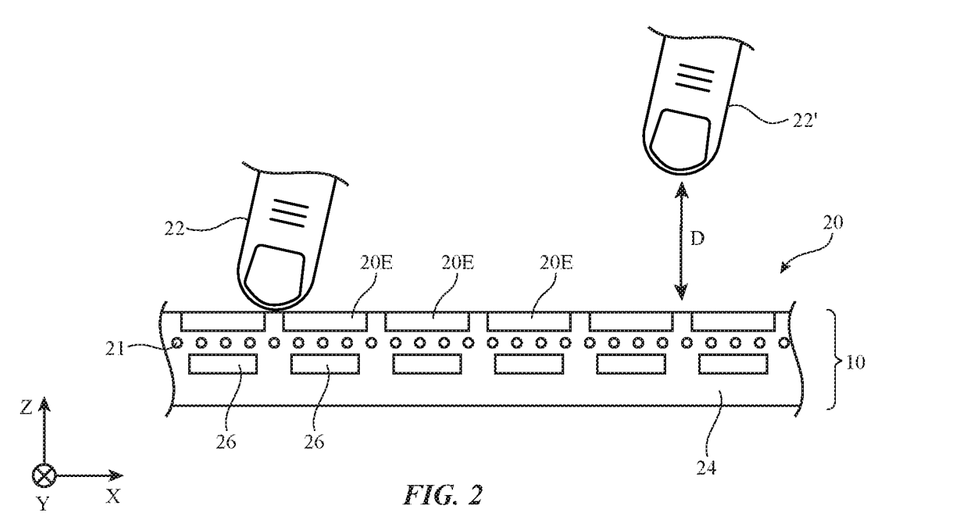
FIG. 2 is a cross-sectional side view of an illustrative sensing strip being used to monitor a user's fingers in accordance with an embodiment.

A cross-sectional side view of a portion of device 10 of FIG. 2 that includes sensing strip 20 is shown in FIG. 2. As shown in FIG. 2, sensing strip 20 may have an array of sensor elements (sensors) such as sensor elements 20E supported by housing 24. Housing 24 may include one or more walls or other support structures and may be formed from metal, polymer, glass, ceramic, crystalline material such as sapphire, fabric, natural materials such as wood, and/or other materials. If desired, haptic elements 26 may be incorporated into device 10. For example, haptic elements 26 may be overlapped by sensing strip 20 so that haptic feedback may be provided to a user's fingers when a user's fingers contact sensing strip 20. Elements 26 may be formed from piezoelectric elements, electromagnetic actuators (e.g., solenoids), and/or other haptic output devices. An optional display (e.g., a two-dimensional array of pixels 21) or other light-emitting elements (e.g., light-emitting diodes) may be overlapped by sensor elements 20E (e.g., to form a reconfigurable set of function keys associated with sensing strip 20, etc.). In other configurations, pixels 21 may be omitted.

As shown in FIG. 2, sensor elements 20E may extend in a strip along the surface of housing 24 (e.g., along horizontal dimension X). Two-dimensional sensor element arrangements (e.g., arrangements in which sensor elements 20E also extend in the perpendicular Y dimension) may be used, if desired. For example, there may be two rows of elements 20E. This type of two-dimensional sensor may detect when lateral (Y-direction) finger motion is present that may be associated with inadvertent user input (e.g., user input that occurs by mistake when a user is typing on an adjacent keyboard). The use of a one-dimensional sensor element array when forming sensing strip 20 may help reduce the size and complexity of sensing strip 20.

Sensor elements 20E may be capacitive sensor electrodes in a capacitive sensor or other suitable sensor elements. As an example, sensor elements 20E may be optical sensor elements that each include a light-emitting diode, laser, or other light emitter (e.g., an infrared light-emitting device) and that include a light detector (e.g., an infrared photodetector). The amount of emitted infrared light that is detected by an infrared photodetector after reflecting from an external object may be used to measure the location of the external object (e.g., a finger) and thereby detect finger contact and/or finger air gestures. Another possible arrangement involves using ultrasonic sound emitters and ultrasonic sound detectors (e.g., microphones) to detect reflected acoustic signals and thereby gather information on touch gestures and/or air gestures. If desired, finger touch and/or proximity measurements may be gathered using radio-frequency sensor elements (radio-frequency emitters and corresponding radio-frequency receivers). Other finger monitoring sensors and/or combinations of these sensors may also be used in forming sensing strip 20. Configurations for sensing strip 20 that use capacitive sensor elements 20E to detect finger contact and/or finger proximity are sometimes described herein as an example.

With capacitive sensing, capacitive sensor signals gathered with strip 20 may be used to determine whether a user's finger is touching sensing strip 20 (see, e.g., illustrative finger 22) and/or whether a user's finger is in close proximity to sensing strip 20 (see, e.g., illustrative finger 22', which is located at a non-zero distance D from strip 20). With one illustrative configuration, sensor signals that are weak (e.g., that have a signal strength below a given threshold and that therefore correspond to distant external objects such as objects at a distance D that is greater than a threshold distance Dth) can be discarded and stronger signals can be processed to gather user input. For example, stronger sensor signals can be processed to determine the value of distance D for each finger (or other external object) that is present over sensing strip 20.

Using capacitive sensor elements 20E for touch sensing and/or capacitive proximity sensing, the activity of one or more of the user's fingers can be measured. Single-finger input may include single-finger taps and surface swipes (touch gestures) and single finger air gestures (e.g., a single-finger hover over a particular location, a single-finger swipe along the X axis of FIG. 2 while the finger is separated from the surface of sensing strip 20 and therefore the surface of housing 24 by a non-zero distance D). Sensing strip 20 may also detect multi-finger input (e.g., multi-touch gestures in which two or more fingers simultaneously provide touch input to sensing strip and multi-finger air gestures in which two or more fingers are sensed while these two or more fingers are present in proximity to sensing strip 20 without contacting the surface of sensing strip 20).

Figure 3:
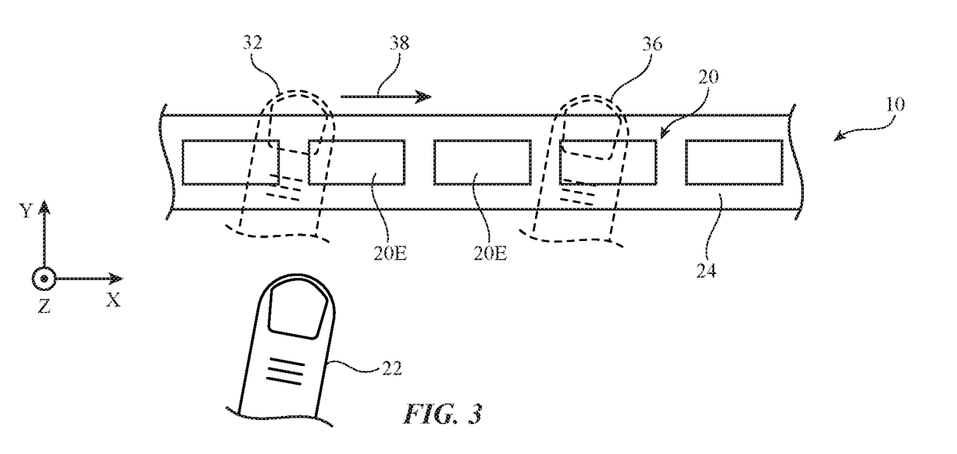
FIG. 3 is a top view of the illustrative sensing strip of FIG. 2 in accordance with an embodiment.

FIG. 3 is a top view of capacitive sensing strip 20 showing how finger 22 may move in direction Y to a position in which the finger is on or hovering above sensing strip 20 (see, e.g., illustrative movement direction 30 and illustrative finger position 32 on or above sensing strip 20 in a first location). When touching or hovering above sensing strip 20 in a given location, the dwell time of the user's finger in that location may be measured and this aspect of the user's finger motion may be evaluated. For example, a highlight-and-select command may involve placement of the user's finger in a particular location of sensing strip 20 (e.g., to highlight a desired selectable on-screen option on display 14) and subsequent dwelling of the user's finger in that location for more than a predetermined amount of time (e.g., 1 second) to serve as a "select" command for the highlighted option. During this highlight-and-select command, the user's finger may touch sensing strip 20 or may hover above sensing strip 20 (in which case detection of the user's air gesture finger motion is performed using the proximity sensing capabilities of sensing strip 20).

In some user input scenarios, the user's finger (whether touching sensing strip 20 or hovering above sensing strip 20) may move along the length of sensing strip 20 (e.g., to adjust a volume slider or other analog on-screen option). This type of swiping motion (sometimes referred to as a swipe gesture) is illustrated in movement of the user's finger from finger position 32 to finger position 36 in direction 38 of FIG. 3. Non-contact gestures (sometimes referred to as three-dimensional gestures or air gestures) may involve this type of lateral swiping motion and/or may involve movement of one or more of the user's finger in the vertical (Z) dimension away from or towards the surface of housing 24 that supports sensing strip 20. As an example, sensing strip 20 can detect how rapidly a user's finger is moving towards strip 20 and can use this information to implement a velocity sensitive virtual piano key in a music application. As another example, haptic devices 26 at the location of a user's finger contact on sensing strip 20 can be triggered in advance finger contact on the surface of sensing strip 20 based on known information on the expected time at which a user's finger will contact sensing strip 20 (e.g., using measured Z-axis finger position and velocity information). In general, any dynamic finger activity (up and down movement in the Z dimension, lateral movement in the X and/or Y dimensions, etc.) can be used in controlling device 10. The foregoing examples are illustrative.

Figure 4:
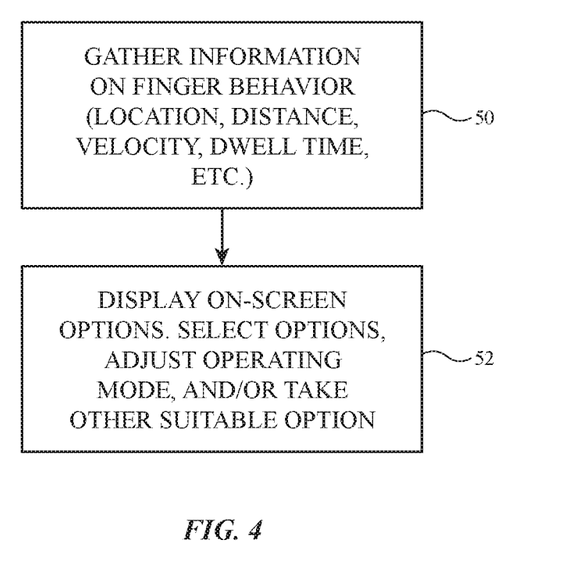
FIG. 4 is a flow chart of illustrative operations associated with using a device of the type shown in FIG. 1 in accordance with an embodiment.

FIG. 4 is a flow chart of illustrative operations involved in using sensing strip 20 and other input-output devices 12 to control electronic device 10. As shown in FIG. 4, control circuitry 16 may use sensing strip 20 and other input-output devices to gather user input during the operations of block 50. Sensing strip 20 may gather finger input from one or more fingers of a user and/or may gather user input from a computer stylus or other external objects. For example, sensing strip 20 may measure the movement of the user's fingers and thereby determine the location, the velocity (speed and direction), acceleration, and other attributes of the user's finger motion. These attributes may include motions associated with touch gestures (taps, swipes, and other movements of one or more fingers along the surface of sensing strip 20) and/or air gestures (e.g., three-dimensional gestures made in the air above sensing strip 20 at a non-zero distance D).

Air gestures may include, for example, gestures in which a user places a finger or multiple fingers at one or more locations along sensing strip 20 and holds the finger(s) at the desired location(s) for more than a predetermined amount of time (e.g., more than a dwell time threshold of at least 0.3 s, at least 0.7 s, at least 1 s, at least 2 s, less than 5 s, less than 3 s, or other suitable dwell time threshold). The dwell time threshold may be adjusted by the user of device 10, if desired. Control circuitry 16 can discriminate between single finger dwell gestures (e.g., placement of a single finger at a given location along sensing strip 20) and multi-finger dwell gestures (e.g., a gesture in which two different fingers are placed and held at two different locations along sensing strip 20).

Swiping motions with one or more fingers can also be used as air gestures. In some arrangements, movement in the X dimensional along the longitudinal axis (length) of sensing strip 20 may be used to swipe icons or other on-screen content off of an area of display 14. In other arrangements, movement in the X dimension may be used to adjust an on-screen control such as an analog-type slider button (e.g., an audio balance control, an audio volume control, a display brightness slider, a display color cast slider, or other analog control). These controls can be updated on display 14 in real time as air gestures information is being gathered. Air gestures involving swipes may also be used to turn pages in a book, to change channels or tracks in an media application, to advance between different pictures in a picture application, etc.

Velocity sensitive controls may be implemented by processing information on the speed of finger movement and, if desired, information on the direction of movement. For example, air gestures may include lateral swipe gestures, vertical swipe gestures, and/or gestures that involve both vertical and/or horizontal movement through the air above sensing strip 20 and control circuitry may use direction of movement and/or finger speed in discriminating between inadvertent input (noise) and intentional gestures.

Some gestures detected by sensing strip 20 may include air movement and sensor contact. For example, a finger tap gesture may involve measurement of downward finger velocity as a user's finger strikes sensing strip 20. This type of gesture may be evaluated when implementing speed-sensitive buttons. Finger removal speed may also be gathered and used as gesture input.

In some arrangements, inadvertent touch events (direct contact with the surface of sensing strip 20 or other inadvertent sensing strip activity) may occur while a user is operating device 10. Control circuitry 16 can distinguish between intended gestures and unintended sensing strip activity by processing information on the movement of the user's fingers. For example, control circuitry 16 can disregard inadvertent contact with sensing strip 20 (any contact or particularly contact involving Y-dimension motion) when a user is involved with touch typing or other non-sensor input on device 10, can disregard input when more than two fingers (or, if desired, more than a single finger) is involved, can disregard gestures that involve motion in unexpected directions (e.g., excessive Z-dimension or excessive Y-dimension motions during a lateral swiping air gesture, excessive motion in any one or more dimensions during a dwell event, etc.).

During the operations of block 52, control circuitry 16 can take suitable action based on the finger activity measured with sensing strip 20 during block 50 and/or other user input provided by input-output devices 12. Control circuitry 16 may, for example, display content on display 14, select icons and/or launch applications associated with displayed icons or other content on display 14, adjust operating parameters in device 10 (e.g., audio volume, display brightness, etc.), adjust the operation mode of device 10 (e.g., by placing device 10 in a low-power sleep state, by turning on or off display 14, by turning on or off wireless communications circuitry in circuitry 16, etc.), launch, cancel, pause, or resume applications and/or other software such as operating system functions, send commands to external equipment (e.g., wireless commands may be sent by wireless communications circuitry in circuitry 16 to adjust audio equipment, lighting, home heating, television operations, and/or to otherwise adjust the operations of external equipment), and/or take other suitable action using user input gathered from sensing strip 20.

Figure 5:
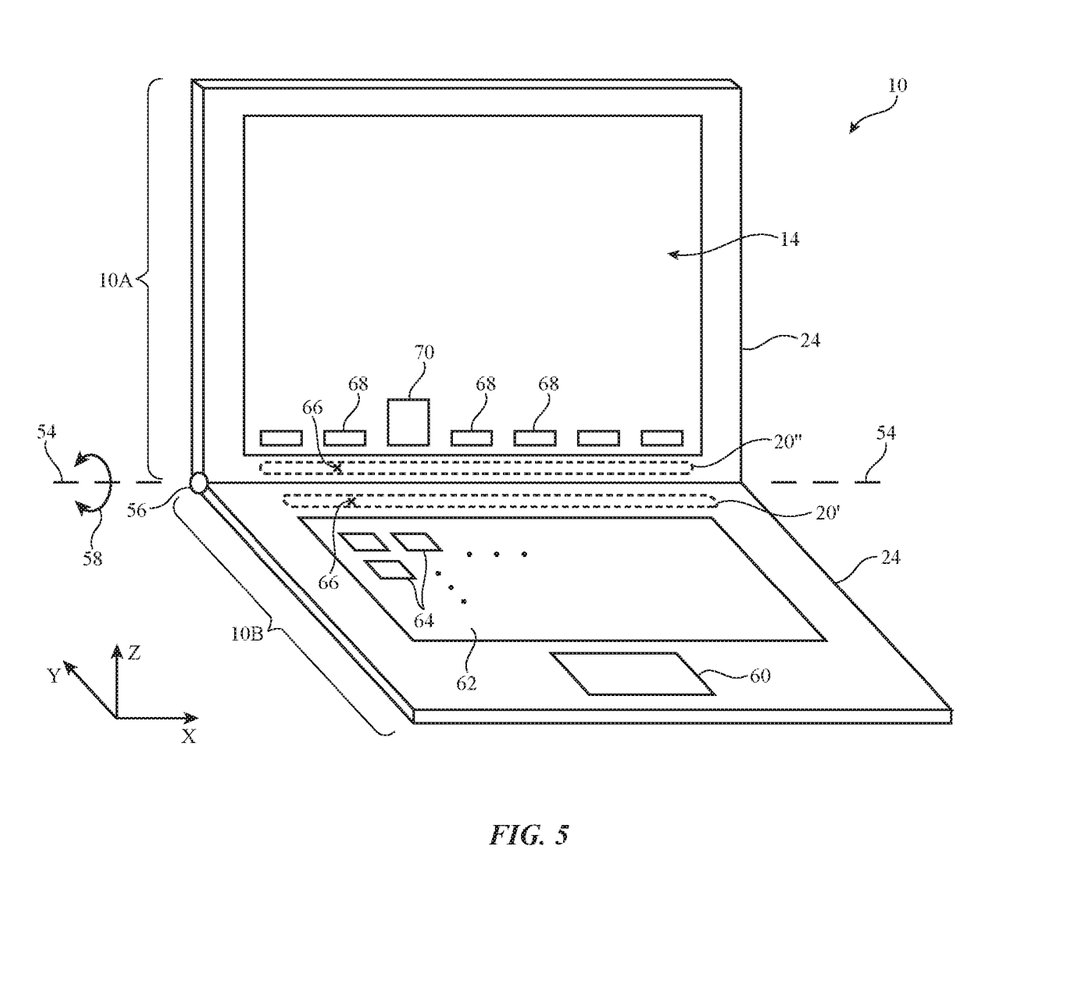
FIG. 5 is a perspective view of an illustrative laptop computer in accordance with an embodiment.

FIG. 5 is a perspective view of device 10 in an illustrative configuration in which device 10 has portions that can be moved relative to each other (e.g., a configuration in which device 10 is a laptop computer). As shown in FIG. 5, device 10 may have upper portion 10A and lower portion 10B. Upper portion 10A may include an upper housing portion of housing 24 that supports display 14. Lower portion 10B may include a lower housing portion of housing 24 that supports a two-dimensional touch sensor such as trackpad 60 and keyboard 62 with an array of keyboard keys 64. Hinges 56 may be provided to allow upper portion 10A to rotate about rotational axis 54 in directions 58 relative to lower portion 10B. Sensing strip 20 can be formed along the upper edge of lower portion 10B (e.g., in position 20' extending along the X axis parallel to the adjacent upper edge of keyboard 62 and adjacent to the upper edge of lower portion 10B of the housing of device 10) and/or sensing strip 20 can be formed along the lower edge of upper portion 10A (e.g., in position 20" extending along the X axis parallel to the adjacent lower edge of display 14).

During operation, a user may place a finger over the sensing strip located in sensing strip location 20' (see, e.g., finger position 66') or may place a finger over the sensing strip located in sensing strip location 20' (see, e.g., finger position 66"). The user may contact the sensing strip or may provide finger input in the form of an air gesture. For example, a user may provide air gesture input by placing a finger in position 66' or 66" while hovering above the sensing strip at a non-zero distance away for a given dwell time. In response to sensing the user's finger input, control circuitry 16 can take suitable action (see, e.g., the operations of block 52). As an example, control circuitry 16 can present a set of selectable on-screen options 68 in a row along the lower edge of display 14 when finger input is received. When a user hovers above a given option, that option may be highlighted (see, e.g., enlarged option 70 in the example of FIG. 5). In response to additional hovering (e.g., for more than a predetermined dwell time) control circuitry 16 can perform an operation associated with option 70.

Options 68 (and selected option 70) may correspond to function key options (default and/or customized), applications (e.g., a word processing application, a spreadsheet application, an internet browser, etc.), operating system functions (e.g., instructions to adjust screen brightness, etc.), and/or may correspond to other on-screen options. If desired, finger gestures such as air gestures that are detected with sensing strip 20 can be used to adjust the operation of device 10 in the absence of on-screen options. As an example, an air gesture may be used to place device 10 in a low-power sleep state without displaying a selectable sleep state option on display 14.

If desired, other air gestures can be used in interacting with options of interest. The example of FIG. 5 in which finger hovering over a particular location is used to highlight a desired option and in which continued presence (dwell) over that location is used to activate the highlighted option is illustrative. As an example, an option can be selected by a hover followed by a swipe, an air gesture with two (or more) fingers can be used to select an option, or an air gesture such as an air gesture swipe may be used to move an on-screen object. If desired, a hovering gesture may be used to highlight a desired option followed by a tap or other touch event to select the highlighted option.

Figure 6:
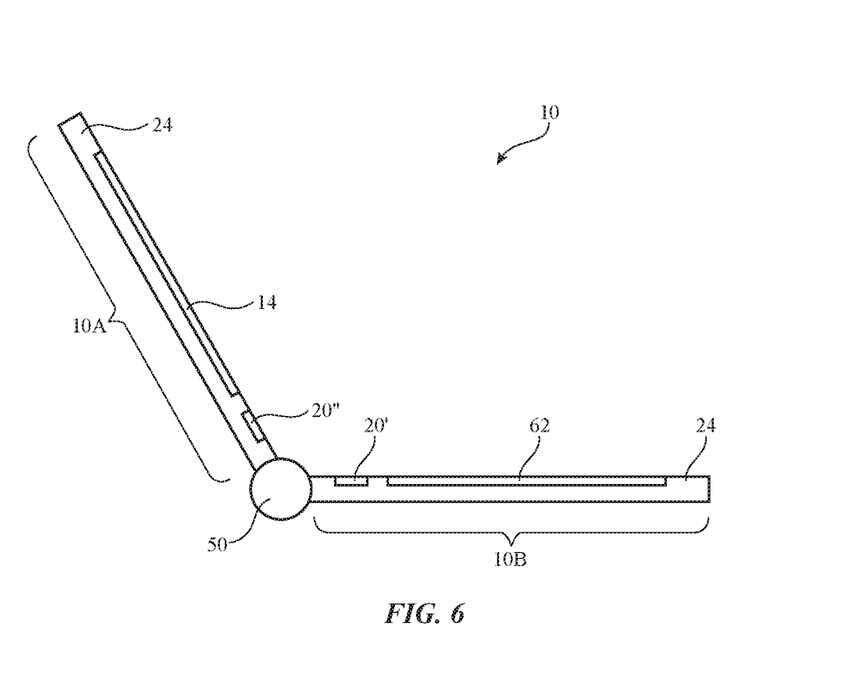
FIGS. 6 and 7 are cross-sectional side views of illustrative laptop computers in accordance with embodiments.
Figure 7:
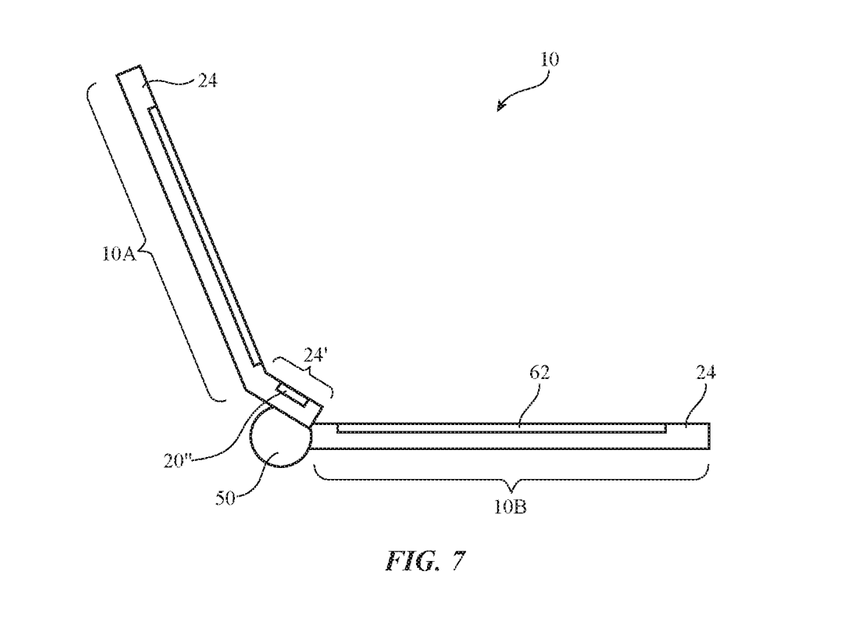

FIGS. 6 and 7 are cross-sectional side views of device 10. The illustrative configuration of FIG. 6 shows how sensing strip 20 can be located adjacent to the upper edge of keyboard 62 in lower portion 10B or can be located adjacent to the lower edge of display 14 in upper portion 10A. In the example of FIG. 7, upper portion 10A includes bent ledge portion 24', which extends at a non-zero angle relative to the rest of upper portion 10A. Ledge portion 24' may, as an example, be tilted outwardly at an angle of 3-20°, at least 5°, less than 25°, or other suitable angle from the plane of display 14 (as an example). If desired, sensing strip 20 can be formed on ledge 24', as shown by illustrative sensing strip location 20" in FIG. 7.

As described above, one aspect of the present technology is the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. A laptop computer, comprising:
   a housing having an upper portion and a lower portion coupled by a hinge;
   a display supported by the upper portion of the housing;
   a keyboard supported by the lower portion and having first and second opposing keyboard edges; and
   a sensing strip including an array of sensors of the same type, wherein the sensing strip is supported by the housing and extends along an edge of the keyboard adjacent to the hinge without overlapping the display, wherein the sensing strip has first and second opposing ends, wherein the first end is adjacent to the first keyboard edge and the second end is adjacent to the second keyboard edge, and wherein the sensing strip spans between the first and second ends; and
   control circuitry configured to gather air gesture input using the sensing strip.

2. The laptop computer defined in claim 1 wherein the display comprises a touch insensitive display, wherein the sensing strip is supported by the lower portion of the housing and comprises a strip-shaped capacitive sensor having an array of capacitive sensor electrodes extending along an axis parallel to the edge of the keyboard, wherein the air gesture input comprises hovering input in which a finger dwells above a location on the strip-shaped capacitive sensor for more than a predetermined dwell time without contacting the strip-shaped capacitive sensor, wherein the control circuitry is configured to display an on-screen option on the touch insensitive display, and wherein the control circuitry is configured to select the on-screen option in response to detecting that the finger has dwelled above the location for more than the predetermined dwell time.

3. The laptop computer defined in claim 1 wherein the sensing strip comprises a one-dimensional array of sensor elements selected from the group consisting of: optical sensors, capacitive sensors, radio-frequency sensors, and ultrasonic sensors.

4. The laptop computer defined in claim 1 wherein the sensing strip is supported by the lower portion of the housing.

5. The laptop computer defined in claim 4 wherein the display comprises a touch insensitive display and wherein the sensing strip comprises a capacitive sensing strip.

6. The laptop computer defined in claim 1 wherein the sensing strip extends along part of the upper portion of the housing adjacent to an edge of the display.

7. The laptop computer defined in claim 6 wherein the part of the upper portion of the housing comprises a ledge that is oriented at a non-zero angle with respect to the display.

8. The laptop computer defined in claim 1 wherein the air gesture input comprise finger gestures and wherein the control circuitry gathers the finger gestures by using the sensing strip to measure finger movement in air above the sensing strip.

9. The laptop computer defined in claim 1 wherein the control circuitry is configured to display selectable on-screen options on the display and wherein the control circuitry is configured to select a given one of the on-screen options based on the air gesture input.

10. The laptop computer defined in claim 1 wherein the hinge is configured to allow the upper portion of the housing to rotate relative to the lower portion of the housing about a hinge axis and wherein the sensing strip extends parallel to the hinge axis.

11. The laptop computer defined in claim 10 further comprising a trackpad supported by the lower portion of the housing, wherein the keyboard is between the sensing strip and the trackpad.

12. The laptop computer defined in claim 1 further comprising a haptic output device overlapped by the sensing strip.

13. The laptop computer defined in claim 12 further comprising an array of pixels overlapped by the sensing strip.

14. An electronic device comprising:
a housing having first and second portions configured to rotate relative to each other about an axis;
a display that is supported by the first portion of the housing; and
an elongated sensing strip including an array of sensors of the same type, wherein the elongated sensing strip is supported by the second portion of the housing and that extends parallel to the axis, wherein the elongated sensing strip is located below a center of the display without overlapping the display; and
control circuitry configured to gather air gesture input using the elongated sensing strip.

15. The electronic device defined in claim 14 further comprising a hinge that couples the first and second portions for rotation about the axis.

16. The electronic device defined in claim 15 further comprising keyboard keys, wherein the elongated sensing strip is between the keyboard keys and the axis.

17. The electronic device defined in claim 16 wherein the elongated sensing strip comprises a one-dimensional array of capacitive sensor electrodes that extends parallel to the axis.

18. An electronic device, comprising:
a housing;
a display supported by the housing; and
an elongated capacitive sensing strip that includes an array of sensors of the same type and that is supported by the housing, wherein the elongated capacitive sensing strip extends parallel to an edge of the display without overlapping the display; and
control circuitry that is configured to gather air gesture input from a finger of a user using the elongated capacitive sensing strip while the finger of the user is not contacting the elongated capacitive sensing strip.

19. The electronic device defined in claim 18 wherein the housing has upper and lower portions that are configured to rotate relative to each other about an axis, wherein the elongated capacitive sensing strip extends parallel to the axis, and wherein the display is supported by the upper portion.

20. The electronic device defined in claim 19 further comprising keys supported by the lower portion, wherein the elongated capacitive sensing strip is located in the lower portion, wherein the elongated capacitive sensing strip extends along an edge of the lower portion, and wherein the elongated capacitive sensing strip is between the keys and the axis.

* * * * *